US012760656B1

(12) United States Patent
Wong et al.

(10) Patent No.: US 12,760,656 B1
(45) Date of Patent: Oct. 13, 2026

(54) PROPULSION SYSTEM WITH INTEGRATED PUSHROD FOR VARIABLE PROPELLER BLADE CONTROL

(71) Applicant: HONEYWELL INTERNATIONAL INC., Charlotte, NC (US)

(72) Inventors: Yates Wong, Phoenix, AZ (US); Ryan Hohl, Phoenix, AZ (US); Ian Conaway, Phoenix, AZ (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 0 days.

(21) Appl. No.: 19/200,008

(22) Filed: May 6, 2025

(51) Int. Cl.
*F01D 15/10* (2006.01)
*B64D 31/16* (2024.01)
*B64D 35/021* (2024.01)
*F02C 6/00* (2006.01)
*B64D 27/33* (2024.01)
*F02K 5/00* (2006.01)

(52) U.S. Cl.
CPC ............. *F01D 15/10* (2013.01); *B64D 31/16* (2024.01); *B64D 35/021* (2024.01); *B64D 27/33* (2024.01); *F02C 6/00* (2013.01); *F02K 5/00* (2013.01)

(58) Field of Classification Search
CPC ... F01D 15/10; F02C 6/00; F02C 7/00; B64D 27/30; B64D 27/33; B64D 35/021; B64D 35/022; B64D 31/16; B64D 31/18
See application file for complete search history.

(56) References Cited

U.S. PATENT DOCUMENTS 4,591,313 A 5/1986 Miyatake et al.
5,001,377 A * 3/1991 Parkinson ........... F16C 33/6607 384/473
5,498,135 A 3/1996 Stallard, III
11,021,234 B1 6/2021 Gornall
11,628,944 B2 4/2023 Novosad et al.
11,787,551 B1 * 10/2023 Graves ..................... H02K 1/30 244/56
11,873,771 B2 1/2024 Cervelli et al.
11,901,795 B1 * 2/2024 Graves ................... H02K 11/33
12,083,893 B1 * 9/2024 Walsh ....................... F16H 3/28
12,122,504 B1 * 10/2024 Loos ...................... B64D 33/08
12,196,090 B1 * 1/2025 Larose ................... B64D 27/33
12,214,894 B1 * 2/2025 Graves ................... B64D 27/33
12,275,514 B1 4/2025 Maxeiner
(Continued)

FOREIGN PATENT DOCUMENTS

CN 103010456 B 7/2015
EP 4091931 A1 11/2022
FR 3141675 A1 5/2024

*Primary Examiner* — William H Rodriguez
(74) *Attorney, Agent, or Firm* — Ingrassia Fisher & Lorenz

(57) ABSTRACT

An electric propulsion system (EPS) includes an integrated pushrod that extends at least partly through a motor section and a gearbox section. The integrated pushrod terminates at a first end and terminates at a second end that is spaced apart from the first end along an axis. The first end is configured to removably and operatively couple to a propeller section, and the second end is configured to removably and operatively couple to a blade pitch actuator for selective actuation of the integrated pushrod along the axis resulting in selective blade pitch adjustment of a propeller. The EPS further includes a radial support feature to radially support the integrated pushrod.

10 Claims, 1 Drawing Sheet

(56) References Cited

U.S. PATENT DOCUMENTS

| | | | | |
|---|---|---|---|---|
| 12,391,395 | B1* | 8/2025 | Graves | B64C 29/0033 |
| 2004/0169336 | A1* | 9/2004 | Azibert | F16J 15/3464 277/370 |
| 2004/0245040 | A1* | 12/2004 | Eda | F16H 57/021 180/444 |
| 2005/0209038 | A1* | 9/2005 | Kempf | B60K 6/36 475/159 |
| 2005/0209039 | A1* | 9/2005 | Kempf | F16C 17/04 475/159 |
| 2019/0135446 | A1* | 5/2019 | Alcalan | B64D 29/06 |
| 2020/0063793 | A1* | 2/2020 | Rossberger | F16C 19/12 |
| 2020/0306598 | A1* | 10/2020 | Ma | A63B 51/16 |
| 2021/0040672 | A1* | 2/2021 | Hu | D06F 23/025 |
| 2022/0337118 | A1* | 10/2022 | Shirai | F16C 35/063 |
| 2024/0136887 | A1* | 4/2024 | Graves | B64C 29/0025 |
| 2024/0253791 | A1* | 8/2024 | Graves | B64D 27/30 |
| 2024/0253797 | A1* | 8/2024 | Tepe | F16H 57/08 |
| 2024/0270393 | A1* | 8/2024 | Graves | B64C 29/0033 |
| 2024/0270394 | A1* | 8/2024 | Graves | H02K 7/08 |
| 2024/0375782 | A1* | 11/2024 | Durocher | H02K 7/006 |
| 2024/0383609 | A1* | 11/2024 | Graves | B64D 35/02 |
| 2025/0052193 | A1* | 2/2025 | Sibbach | F02C 6/20 |
| 2025/0122830 | A1* | 4/2025 | Sibbach | F02C 7/36 |

* cited by examiner

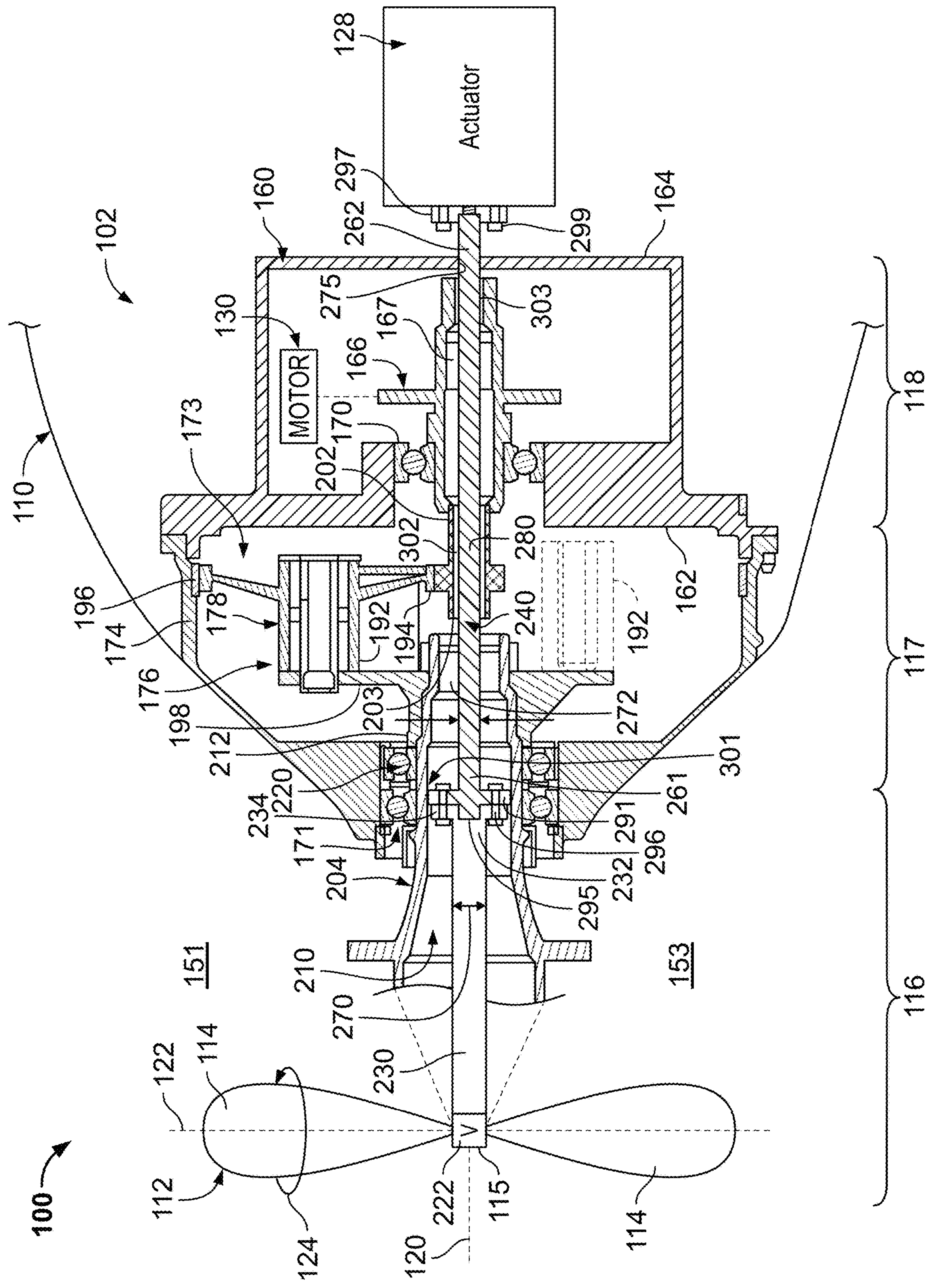
Actuator
MOTOR
100
102
110
112
114
115
116
117
118
120
122
124
128
130
151
153
160
162
164
166
167
170
171
173
174
176
178
192
194
196
198
202
203
204
210
212
220
222
230
232
234
240
261
262
270
272
275
280
291
295
296
297
299
301
302
303

PROPULSION SYSTEM WITH INTEGRATED PUSHROD FOR VARIABLE PROPELLER BLADE CONTROL

TECHNICAL FIELD

The present disclosure generally relates to a propulsion system and, more particularly, relates to a propulsion system with an integrated pushrod for variable propeller blade control.

BACKGROUND

Some propulsion systems include variable-pitch propeller configurations. In these systems, the blades of the propeller may be selectively rotated about their longitudinal axis to change the blade pitch. Accordingly, the blade pitch may be selectively adjusted to maintain high efficiency over a wide range of operating conditions.

However, these propulsion systems may suffer from certain disadvantages. For example, these propulsion systems may be bulky and large. These propulsion systems may include relatively high-cost materials, parts, and/or may be difficult to manufacture. Furthermore, these propulsion systems may be relatively heavy, which may negatively affect operating efficiency.

Hence, there is a need for a propulsion system that is more compact, that reduces materials and manufacturing costs, and that has reduced weight. The present disclosure addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An electric propulsion system (EPS) is disclosed for a vehicle with a blade pitch actuator and a propeller section having a propeller that is supported for rotation about an axis. The EPS includes a motor section with an electric motor. The EPS includes a gearbox section with a planetary gearset operatively connected to the electric motor and configured to transfer power from the electric motor to the propeller section for driving rotation of the propeller about the axis. The EPS also includes an integrated pushrod that extends along the axis at least partly through the motor section and along the axis at least partly through the gearbox section. The integrated pushrod terminates at a first end and terminates at a second end that is spaced apart from the first end along the axis. The first end is configured to removably and operatively couple to the propeller section, and the second end is configured to removably and operatively couple to the blade pitch actuator for selective actuation of the integrated pushrod along the axis resulting in selective blade pitch adjustment of the propeller. The EPS further includes a radial support feature disposed in one of the motor section and the gearbox section to radially support the integrated pushrod.

A method of manufacturing an electric propulsion system (EPS) for a vehicle with a blade pitch actuator and a propeller section having a propeller that is supported for rotation about an axis is disclosed. The method includes providing a motor section and a gearbox section, wherein the motor section includes an electric motor, and the gearbox section includes a planetary gearset. The method also includes operatively connecting the electric motor and the planetary gearset for transferring power from the electric motor to the planetary gearset. Also, the method includes extending an integrated pushrod along the axis at least partly through the motor section and along the axis at least partly through the gearbox section. The integrated pushrod terminates at a first end, and the integrated pushrod terminates at a second end that is spaced apart from the first end along the axis. The first end is configured to removably and operatively couple to the propeller section and the second end configured to removably and operatively couple to the blade pitch actuator for selective actuation of the integrated pushrod along the axis resulting in selective blade pitch adjustment of the propeller. Moreover, the method includes radially supporting the integrated pushrod with a radial support feature disposed in one of the motor section and the gearbox section.

An electric propulsion system (EPS) for a vehicle is disclosed that includes a blade pitch actuator and a propeller section having a propeller that is supported for rotation about an axis. The EPS also includes a motor section with an electric motor and a gearbox section with a planetary gearset operatively connected to the electric motor and configured to transfer power from the electric motor to the propeller section for driving rotation of the propeller about the axis. The gearbox section is arranged along the axis between the propeller section and the motor section, and the motor section is arranged along the axis between the gearbox section and the blade pitch actuator. The EPS further includes an integrated pushrod that extends along the axis at least partly through the motor section and along the axis at least partly through the gearbox section. The integrated pushrod terminates at a first end, and the integrated pushrod terminates at a second end that is spaced apart from the first end along the axis. The first end is removably and operatively coupled to the propeller section, and the second end is removably and operatively coupled to the blade pitch actuator for selective actuation of the integrated pushrod along the axis resulting in selective blade pitch adjustment of the propeller. Furthermore, the EPS includes a first radial support feature disposed in the motor section that radially supports the integrated pushrod and a second radial support feature disposed in the gearbox section that radially supports the integrated pushrod.

Other desirable features and characteristics of the apparatus and method will become apparent from the subsequent detailed description and the appended claims, taken in conjunction with the accompanying drawings and the preceding background.

BRIEF DESCRIPTION OF THE DRAWINGS

The present disclosure will hereinafter be described in conjunction with the following drawing figures, wherein like numerals denote like elements, and wherein:

FIG. 1 is a partially schematic axial cross-sectional view of a portion of an aircraft with an electric propulsion system (EPS) according to exemplary embodiments of the present disclosure.

DETAILED DESCRIPTION

The following detailed description is merely exemplary in nature and is not intended to limit the present disclosure or the application and uses of the present disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the present disclosure and not to limit the scope of the present disclosure which is defined by the claims. Furthermore, there is no intention to be bound by any expressed or implied theory presented in the preceding technical field, background, brief summary, or the following detailed description.

The present disclosure generally relates to propulsion systems, such as electric propeller-based propulsion systems for aircraft, watercraft, and the like. The propulsion systems of the present disclosure may be lightweight to offset the weight of power electronic systems components such as batteries, inverters, conductive material, fuel cells, etc. The propulsion systems may be compact for advantageous space savings. The propulsion systems may provide increased manufacturing efficiencies as well.

In some embodiments, the propulsion system of the present disclosure includes a motor section with an electric motor. The propulsion system may also include a gearbox section with a geartrain configured to transfer mechanical (i.e., rotational) power to a propeller section at a predetermined gear ratio. The propeller section may include a variable-pitch propeller, which includes blades mounted on a hub. The blades are supported for selective variation of their angle of attack (pitch), allowing for optimized performance at different speeds and flight conditions. The propulsion system further includes an integrated pushrod, which extends through the motor section and the gearbox section. The integrated pushrod may removably connect to the propeller section on one end and may removably attach to a blade pitch actuator on an opposite end. The integrated pushrod may have a reduced diameter, thereby allowing the geartrain and/or other components to have reduced weight, dimensions, etc. Accordingly, the propulsion system may be lightweight, compact, and/or may provide various manufacturing advantages.

Referring now to FIG. 1, a vehicle such as an aircraft 100 is illustrated. Generally, the aircraft 100 may include an aircraft body 110, which supports a propulsion system 102. The propulsion system 102 may comprise an electric propulsion system (EPS) 102, which is configured according to the teachings of the present disclosure. It will be appreciated that the EPS 102 may be configured for another vehicle, such as a watercraft, etc. without departing from the scope of the present disclosure.

The EPS 102 may include a motor section 118, a gearbox section 117, and a propeller section 116, which may be arranged along an axis 120. The gearbox section 117 may be disposed along the axis 120 between the motor section 118 and the propeller section 116 and may operatively connect the same. For reference purposes, a first side 151 and a second side 153 of the axis 120 are indicated.

The motor section 118 may include an electric motor 130, which is housed and supported within a motor housing 160. The motor housing 160 may be hollow and substantially cylindrical with a first axial end 162 and a second axial end 164. The electric motor 130 may be a known motor with a stator member that is fixed to the motor housing 160 and a rotor member that is attached to a motor output member 166. The motor 130 may be powered by batteries, a fuel cell, or other electrical power source. During operation, the motor 130 may output rotational energy and rotate the motor output member 166 about the axis 120.

The motor output member 166 may be cylindrical and may include a central bore opening 167 centered on the axis 120. The motor output member 166 may be supported for rotation by a motor bearing 170 (e.g., a roller-element bearing) within a pass-through opening 172 in the first axial end 162 of the motor housing 160. The motor output member 166 may also include an outer flange 168 that radiates outward from the axis 120. The outer flange 168 may be operatively attached to and/or may define part of the rotor member of the motor 130. Thus, power from the motor 130 may drive the motor output member 166 in rotation about the axis 120, and this power may be delivered to the gearbox section 117.

The gearbox section 117 may include a hollow gearbox housing 174. The gearbox housing 174 may include a first end opening 171 and a second end opening 173, which are separated along the axis 120. The gearbox section 117 may include a geartrain 176 housed therein. In some embodiments, the geartrain 176 may be configured with a planetary gearset 178 (i.e., an epicyclic gear train) having one or more planet gears 192 meshed radially between a sun gear member 194 and an outer ring gear 196. The sun gear member 194 may be operatively connected and fixed for rotation with the motor output member 166 by a coupling shaft 202. More specifically, the coupling shaft 202 may be fixed on one end to the motor output member 166, and the sun gear member 194 may be fixed on the outer radial area of the coupling shaft 202. The coupling shaft 202 may include a central bore opening 203 that is centered on the axis 120. The ring gear 196 may be supported within (e.g., fixed within) the gearbox housing 174. There may be a plurality of planet gears 192, which are supported by a carrier 198. The planet gears 192 may be enmeshed with the sun gear member 194 and the ring gear 196 to rotate the carrier 198 about the axis 120. The carrier 198 may be fixedly attached to a propeller output shaft 204. Accordingly, the geartrain 176 may transfer rotational power from the motor output member 166 to the propeller output shaft 204 at a predetermined gear ratio.

The propeller output shaft 204 may be hollow and cylindrical and may be centered on the axis 120. The propeller output member 104 may include a central aperture 210 that extends along the axis 120. The propeller output member 104 may include an outer radial surface 212 that faces substantially outward radially from the axis 120. The radius of the central aperture 210 and/or the radius of the outer radial surface 212 may vary along the longitudinal length of the propeller output shaft 204. The propeller output shaft 204 may be partly received within the gearbox housing 174 and fixed within the carrier 198 of the planetary gearset 178. The propeller output shaft 204 may extend longitudinally out of the gearbox housing 174 and may be supported for rotation about the axis 120 by one or more output bearings 220.

The propeller section 116 may include a propeller 112 with a hub 115 and a plurality of blades 114 that radiate therefrom. The blades 114 of the propeller 112 may be spaced apart in a circumferential direction about the axis 120, and each blade 114 may extend longitudinally along a respective radial axis 122 relative to the axis 120. The hub 115 may be fixedly attached to the propeller output shaft 204 so as to rotate in synchronization therewith.

The blades 114 may have variable pitch capability. Accordingly, the blades 114 may be selectively rotated about the respective radial axis 122 as indicated by arrow 124 to selectively adjust pitch angle of the blade 114. As represented in FIG. 1, the hub 115 may support a known variable pitch mechanism 222 (schematically represented by a "V" in FIG. 1), such as a hydraulic pump, piston, etc., and the propeller 112 may include a connection rod 230 that projects from the hub 115 along the axis 120. One end of the connection rod 230 may be operatively connected to the variable pitch mechanism 222 so as to rotate in synch with the propeller 112 and such that axial movement of the connection rod 230 along the axis 120 coincidentally rotates the blades 114 about the respective radial axis 122. The connection rod 230 may project from the axis 120 to be received in the propeller output shaft 204. The connection rod 230 may terminate at a terminal end 232 within the propeller output shaft 204. The terminal end 232 may include an end coupling 234.

The EPS 102 may further include a blade pitch actuator 128. The actuator 128 may be an electric actuator in some embodiments. The motor section 118 may be disposed axially between the gearbox section 117 and the blade pitch actuator 128.

Furthermore, the EPS 102 may include an integrated pushrod 240, which extends along the axis 120 through the gearbox section 117 and the motor section 118 to operatively attach the connection rod 230 and the blade pitch actuator 128. The integrated pushrod 240 may be integrated into the gearbox section 117 and motor section 118 to provide various advantages, such as weight savings, compactness, material cost reductions, lower part count, increased manufacturing efficiency as will be discussed.

The integrated pushrod 240 may be axially straight and aligned with the axis 120. The integrated pushrod 240 may include and may terminate at a first end 261 and a second end 262. The first end 261 may extend toward and may removably couple to the connection rod 230 of the propeller section 116. The second end 262 may be spaced apart along the axis 120 from the first end 261. The second end 262 may extend toward and may removably couple to the blade pitch actuator 128. In some embodiments, the first end 261 is disposed axially and radially within the gearbox housing 174 with respect to the axis 120 (e.g., within the first end opening 171 and within the propeller output shaft 204). The first end 261 may be exposed from and accessible within the gearbox housing via the first end opening 171. Also, the second end 262 may project axially outward from an opening 275 in the second axial end 164 of the motor housing 160.

The first end 261 may include a first end coupling member 291. The first end coupling member 291 may comprise a flange or disc that projects radially. The first end coupling member 291 may also include one or more fasteners 296 that extend through both the first end 261 and the terminal end 232 of the connection rod 230. Furthermore, in some embodiments, the first end coupling member 291 may include a pilot projection 295 that is received in the terminal end 232 of the connection rod 230. Accordingly, the first end 261 may conveniently attach to the connection rod 230.

The second end 262 may include a second end coupling member 297. The second end coupling member 297 may comprise a flange or disc that projects radially. The second end coupling member 297 may also include one or more fasteners 299, such as lock nuts, for removably attaching the second end 262 to the blade pitch actuator 128.

The integrated pushrod 240 may include a shaft 280 with a solid, circular cross section taken normal to the axis 120. The shaft 280 may have a substantially constant diameter 272 along a majority of the axial length thereof. The first end coupling member 291 and the second end coupling member 292 may be larger in diameter than the shaft 280 (i.e., the diameter 272 may be less than that of the first and second end coupling members 291, 292). Also, the diameter 272 of the shaft 280 may be less than a diameter 270 of the connection rod 230. Stated differently, the shaft 280 of the integrated pushrod 240 may have a minimum outer radial dimension (e.g., the diameter 272) along an axial length thereof, and the minimum outer radial dimension (e.g., the diameter 272) may be less than the minimum outer radial dimension (e.g., the diameter 270) of the connection rod.

The EPS 102 may further include at least one radial support feature for the integrated pushrod 240. The radial support feature(s) may be disposed within one of the motor section 118 and the gearbox section 117. The radial support feature(s) may provide radial support to the integrated pushrod 240 (e.g., to resist bending, buckling, etc. due to forces/loads directed radially to the integrated pushrod 240). In some embodiments, the EPS 102 may include a first radial support feature 301, a second radial support feature 302, and a third radial support feature 303, which are spaced apart axially along the integrated pushrod 240.

In some embodiments, the first radial support feature 301 may comprise a slip fit interface of an outer radial surface of the first end coupling member 291 against the inner radial surface of the propeller output shaft 204. Accordingly, the first end coupling member 291 may slip and slide axially against the inner radial surface of the first end coupling member 291. Also, the second radial support feature 302 may comprise a bushing that is received in the central bore opening 203 of the sun gear member 194 and that is disposed radially between the sun gear member 194 and the integrated pushrod 240. Furthermore, the third radial support feature 303 may comprise a rolling element bearing (e.g., a needle-roller bearing) that is received in the central bore opening 167 of the motor output member 166 and that is disposed radially between the motor output member 166 and the integrated pushrod 240. The third radial support feature 303 may also include a fluid seal for limiting fluid leakage axially therethrough.

During operation, the actuator 128 may selectively actuate the integrated pushrod 240 and the connection rod 230 axially along the axis 120 relative to the hub 115 of the propeller 112, thereby rotating the blades 114 about the respective radial axis 122 and changing pitch of the blades 114. The first, second, and third radial support features 301, 302, 303 may each allow axial sliding along the axis 120 while also supporting the integrated pushrod 240 against radial loads.

Accordingly, the integrated pushrod 240 may have a reduced diameter 272 without compromising strength or robustness. As a consequence, the dimensions of the sun gear member 194, the planet gears 192, and/or the ring gear 196 may be reduced. The gearbox housing 174 may be smaller as well. Accordingly, the EPS 102 may be smaller, more compact, and lighter. This may advantageously increase operating efficiency, reduce manufacturing costs, etc.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An electric propulsion system (EPS) for a vehicle with a blade pitch actuator and a propeller having a hub and a plurality of blades that radiate from the hub and that is supported for rotation about an axis, the EPS comprising:

a motor section with an electric motor;

a gearbox section including a propeller output shaft and a planetary gearset, the propeller output shaft coupled to the hub and including an inner radial surface that defines an aperture, the planetary gear set operatively connected to the electric motor and to the propeller output shaft and configured to transfer power from the electric motor to the propeller output shaft for driving rotation of the propeller about the axis;

a propeller section including a connection rod that extends along the axis and is at least partially located within the aperture in the output shaft, the connection rod having a connection rod first end, a connection rod second end, and a connection rod minimum outer radial dimension along its axial length, the connection rod first end coupled to the hub;

an integrated pushrod that extends along the axis through the motor section, the gearbox section, and at least partly into the aperture of the output shaft, the integrated pushrod terminating at a pushrod first end, the integrated pushrod terminating at a pushrod second end that is spaced apart from the pushrod first end along the axis, the pushrod first end removably and operatively coupled to the connection rod second end and the pushrod second end configured to removably and operatively couple to the blade pitch actuator for selective actuation of the integrated pushrod along the axis resulting in selective blade pitch adjustment of the propeller, the integrated pushrod having a pushrod minimum outer radial dimension along its axial length, the pushrod minimum outer radial dimension being less than the connection rod minimum outer radial dimension; and a radial support feature disposed in the gearbox section to radially support the integrated pushrod, wherein the planetary gearset includes a sun gear member, a ring gear, and a planetary gear disposed radially between the sun gear member and the ring gear and supported by a carrier, the sun gear member including an opening that receives the integrated pushrod, and wherein the radial support feature comprises a bushing received in the opening and disposed radially between the sun gear member and the integrated pushrod.

2. The EPS of claim 1, wherein the pushrod second end includes a pushrod second end coupling with a fastener that removably attaches the pushrod second end to the blade pitch actuator.

3. The EPS of claim 2, wherein the fastener comprises a lock nut.

4. The EPS of claim 1, wherein the gearbox section includes a gearbox housing with a first end opening, the pushrod first end disposed axially and radially within the gearbox housing with respect to the axis, the pushrod first end exposed via the first end opening.

5. The EPS of claim 1, wherein the motor section includes a motor housing with a pushrod second end opening, the pushrod second end projecting out from the motor housing along the axis via the pushrod second end opening.

6. The EPS of claim 1, wherein the electric motor includes a motor output member with an opening that receives the integrated pushrod, the motor output member operatively coupled to the planetary gearset, and wherein the EPS further comprises a rolling-element bearing disposed radially between the motor output member and the integrated pushrod.

7. The EPS of claim 1, wherein the integrated pushrod includes a pushrod outer radial surface, and wherein the EPS system further comprises a slip-fit interface of the pushrod outer radial surface against the inner radial surface of the propeller shaft for sliding movement of the outer radial surface against the inner radial surface along the axis.

8. The EPS of claim 7, wherein the integrated pushrod includes a shaft and a pushrod first end coupling attached to the shaft and defining the pushrod first end, the pushrod first end coupling including the pushrod outer radial surface, the shaft having shaft outer radial dimension that is less than that of the pushrod outer radial surface.

9. The EPS of claim 8, further comprising:

a slip-fit interface of the pushrod outer radial surface against the inner radial surface of the output shaft for sliding movement of the pushrod outer radial surface against the inner radial surface of the output shaft along the axis.

10. The EPS of claim 1, wherein:

the electric motor includes a motor output member with an opening that receives the integrated pushrod, the motor output member operatively coupled to the planetary gearset; and the EPS further comprises a rolling-element bearing disposed radially between the motor output member and the integrated pushrod.

* * * * *